United States Patent [19]
Martin

[11] 3,922,156
[45] Nov. 25, 1957

[54] GLAZING APPARATUS
[75] Inventor: John Martin, Monterrey, Mexico
[73] Assignee: Fabricacion de Maquinas, S.A., Monterrey, Mexico
[22] Filed: Dec. 23, 1974
[21] Appl. No.: 535,195

[52] U.S. Cl. ................ 65/272; 65/120; 65/252; 65/284
[51] Int. Cl.² ................................. C03B 29/00
[58] Field of Search .............. 65/120, 252, 272, 284

[56] References Cited
UNITED STATES PATENTS

| | | | |
|---|---|---|---|
| 2,073,144 | 3/1937 | Darrah | 65/120 |
| 2,209,252 | 7/1940 | Stewart et al. | 65/272 X |
| 2,422,482 | 6/1947 | Guyer | 65/284 X |
| 3,395,008 | 7/1968 | Keefer | 65/272 X |

Primary Examiner—Arthur D. Kellogg
Attorney, Agent, or Firm—Kemon, Palmer & Estabrook

[57] ABSTRACT

A glazing unit for removing mold separation marks from press molded glassware includes a refractory oven, sized to snugly surround a vertical stack of ware to be treated. The oven is open at the bottom and at the top to permit movement of the ware therethrough. Tangentially arranged inclined nozzles at the upper end of the oven create a downwardly directed swirling blanket of hot gases around the periphery of the stack of ware and these gases exit through passageways at the bottom of the oven. An electric current may be conducted to the periphery of the ware through the hot gases to assist in the remelting of the rim of the ware and means are provided to advance the ware through the oven by adding one piece at a time to the bottom of the stack while removing one piece at a time from the top of the stack.

9 Claims, 6 Drawing Figures

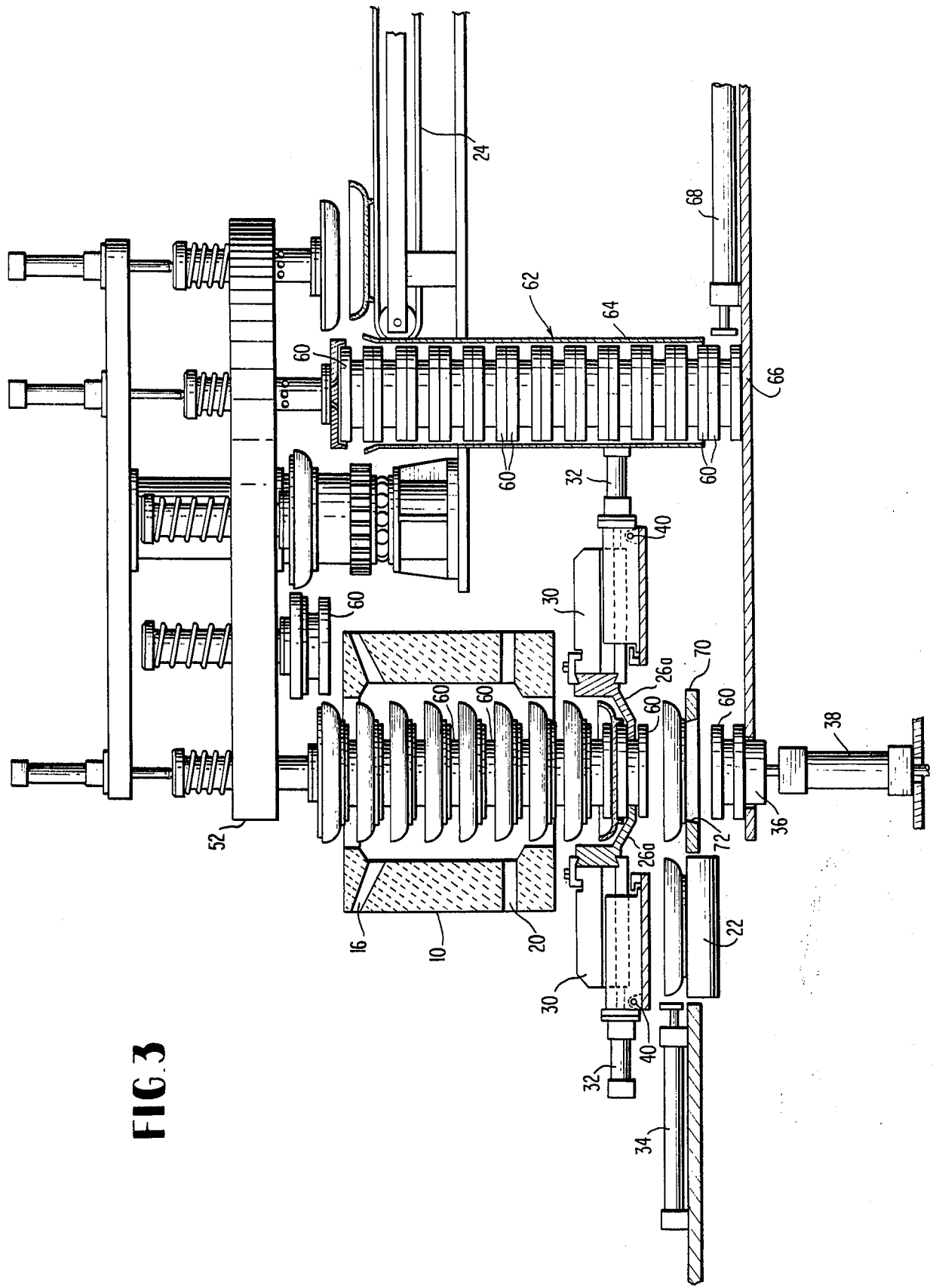

GLAZING APPARATUS

BACKGROUND OF THE INVENTION

Glass dinnerware which has been press molded emerges from the mold with a mold match mark at the periphery of the rim of the ware. This match mark is a thin projection of glass having a sharp edge which must be removed both from an aesthetic viewpoint as well as to prevent injury to those handling the ware. Conventionally, these match marks are removed by glazing which is the art term for remelting of the edge portion of the ware. Once the rim portion has been rendered molten, surface tension smooths out the edge of the ware to an attractive round bead which is free of any sharp projections. Glazing as carried out in the prior art was done on a continuous chain type conveyor where the individual articles are rotated while traveling through a fuel-fired tunnel so that the edges of the ware are remelted by a combination of radiant heat and direct flame impingement. Glazing units of this type were designed in the days when fuel such as natural gas was both cheap and abundant and operation of such units required approximately 6½ million BTU's per hour to glaze 50 dishes per minute. This corresponds to an actual efficiency of less than 1% due to the large losses which are inherent in the system. The losses are due to the fact that any one imaginary particle of heat has only about one chance in a thousand to come in direct contact with the glass to be remelted and once it is advanced beyond the edge of the ware, it is expelled to the exhaust with no second opportunity for heat recovery.

BRIEF SUMMARY OF THE INVENTION

In accordance with the present invention, the ware is stacked and then advanced vertically through the oven with one piece added to the bottom of the stack as one piece is removed from the top. The oven is sized to snugly surround a stack of about 10 or 12 pieces which substantially completely fill the interior of the oven. The burner nozzles are tangentially arranged adjacent the upper portion of the oven and create a swirling blanket of hot gases which surround the ware and progress in a circular pattern from the top to the bottom of the oven. In addition, an electric current is conducted to the edge of the ware through the hot ionized gases to assist in rapid remelting of the rim portion to remove the match marks. Due to the efficient use of the hot gases within the oven proper, the BTU imput per hour for glazing 80 pieces per minute is reduced from the prior art figure of 6½ million to about 100 thousand.

BRIEF DESCRIPTION OF THE DRAWINGS

FIG. 3 is a side elevation partially in section of a modification of the apparatus shown in FIG. 1;

DETAILED DESCRIPTION

Figure 1:
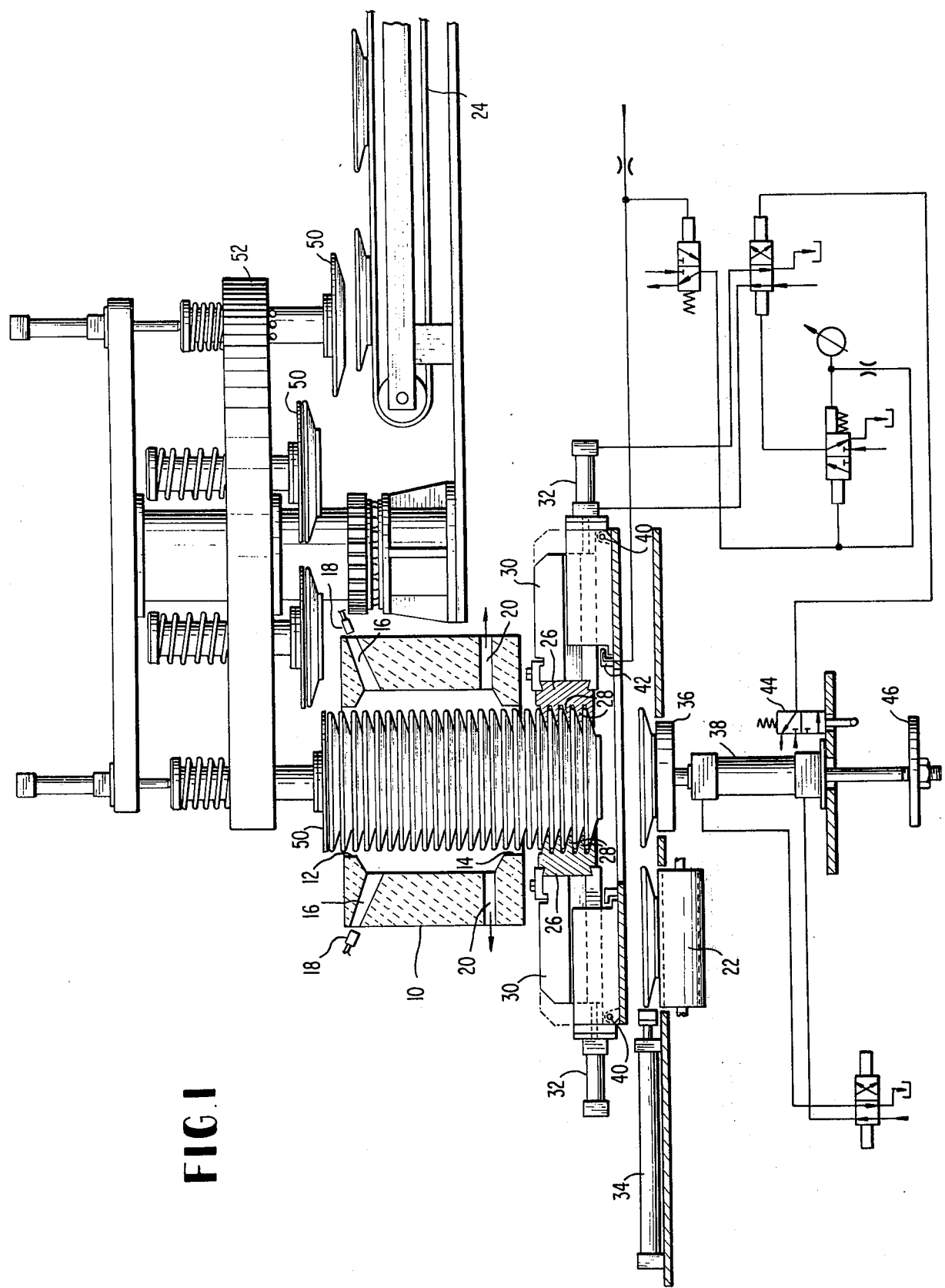
FIG. 1 is a side elevation partially in section of a preferred embodiment of the present invention.
Figure 2:
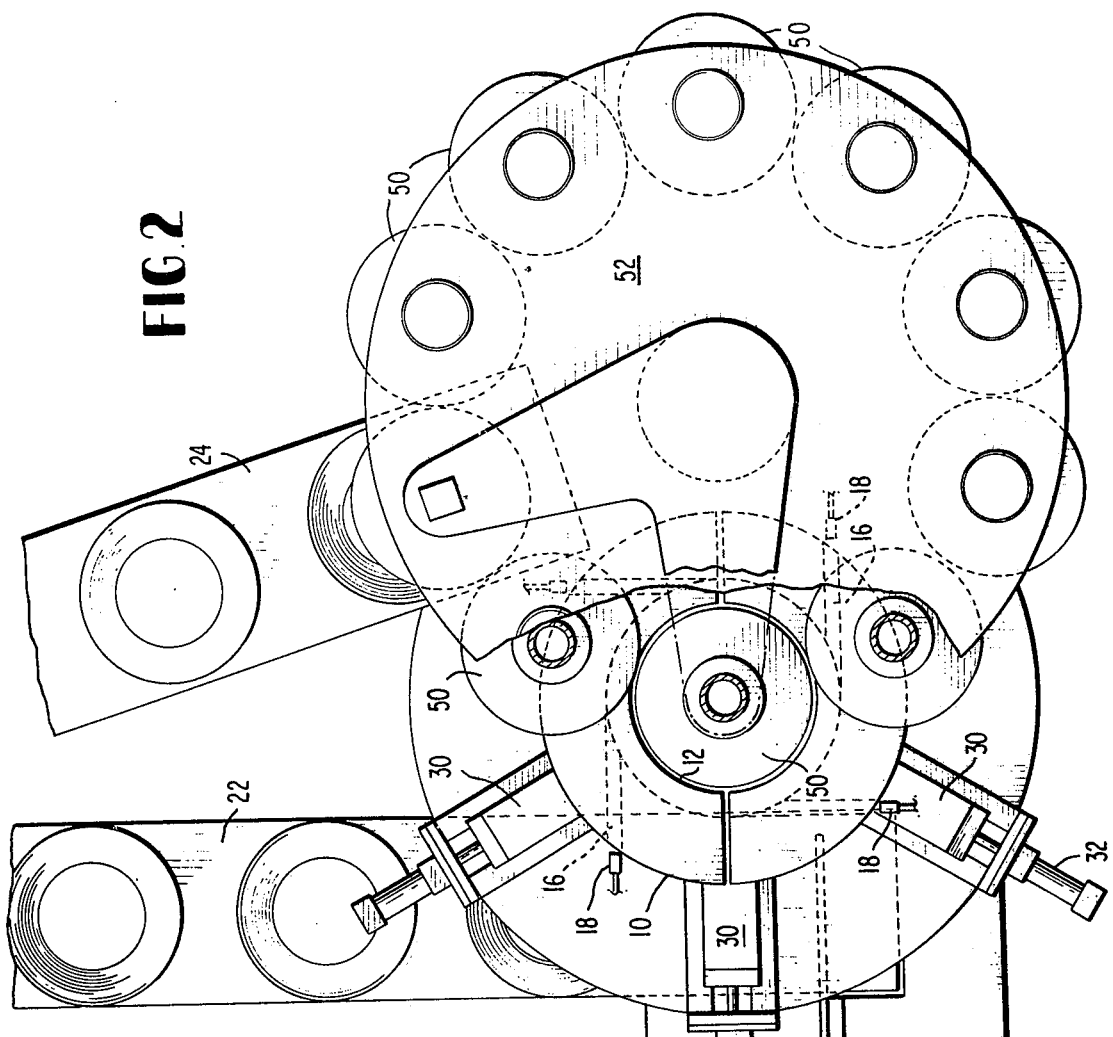
FIG. 2 is a top plan view of the apparatus shown in FIG. 1.

Referring first to FIGS. 1 and 2, a glazing oven is shown at 10. This is preferably formed of a refractory material and includes vertically aligned top and bottom openings 12 and 14 of sufficient diameter to permit passage therethrough of a stack of ware to be glazed. At the upper end of the oven 10 there are a plurality of downwardly inclined passageways 16 which open tangentially into the interior portion of the oven. Burner nozzles 18 aligned with these passageways direct burning fuel into the oven to create a downwardly swirling annular blanket of hot gases surrounding the ware to be glazed. Passageways 20 at the lower end of the oven 10 vent these gases back to the atmosphere.

Ware to be glazed may be conveyed to the glazing unit on a belt conveyor 22 and the finished ware may be taken off on a second conveyor 24. The relative positions of these conveyors are correctly shown in FIG. 2 but are changed in FIG. 1 for illustrative purposes.

Figure 4:
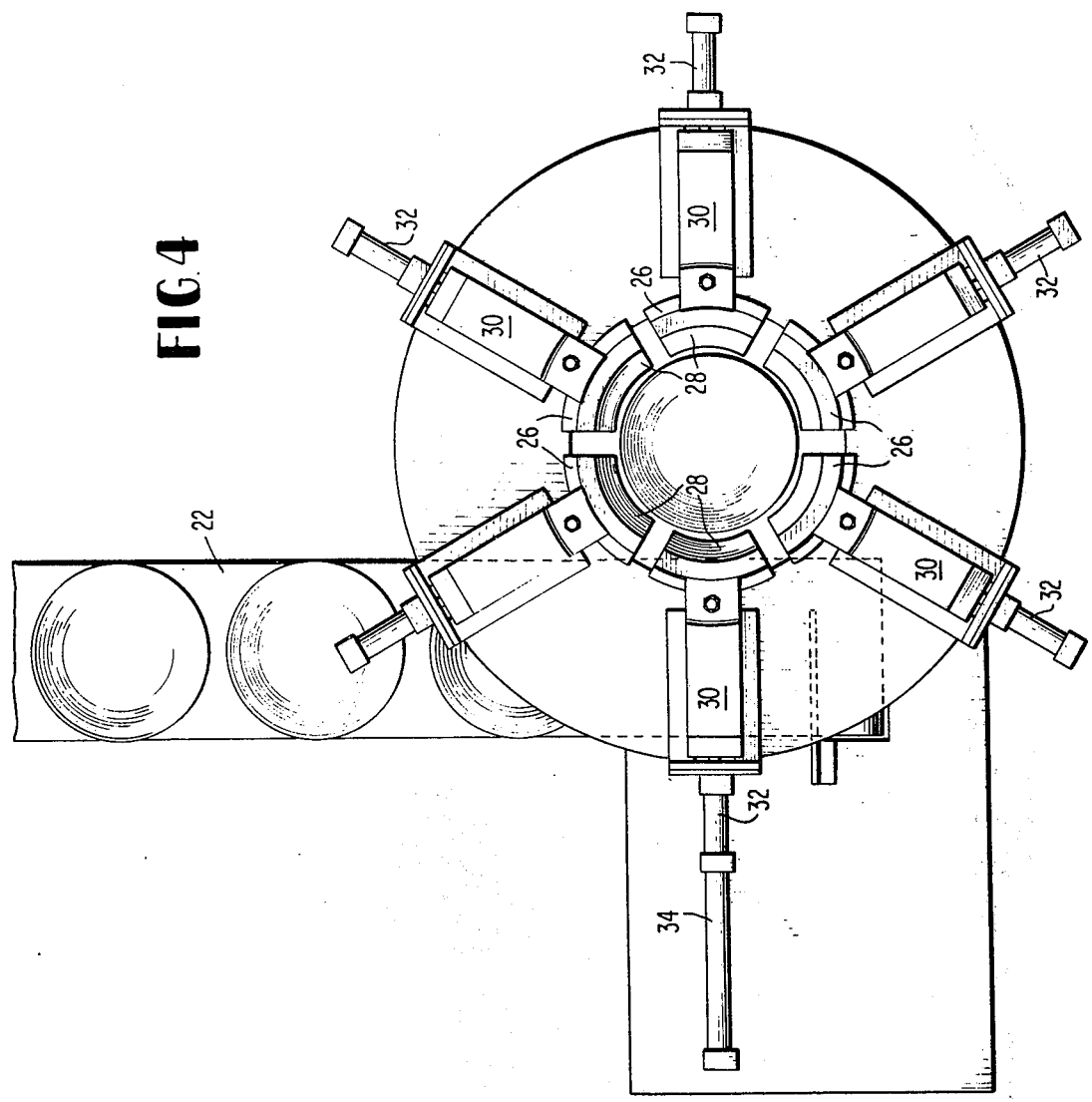
FIG. 4 is a top plan view of the stack supporting portion of the apparatus of either FIGS. 1 or 3.

As shown in FIG. 1, the stack of ware within the oven is supported at the bottom by jaw members 26 having a plurality of fingers 28. As shown in FIG. 4, there may be six such jaw members each comprising a substantially equal segment of a circle. Each jaw member is mounted on a slide 30 positionable by means of a cylinder 32 between ware engaging positions as shown in FIG. 1 and a retracted position as indicated in dotted line in FIG. 1.

Ware from the feed conveyor 22 is transferred one at a time by means of an air cylinder 34 to a platform 36 which is elevatable by means of an air cylinder 38. As shown, the platform 36 supports a single plate in alignment with the stack of plates contained within the oven 10. Control of the addition of plates to the bottom of the stack is initiated by an air signal from a timing drum. This is effective to elevate the platform 36 until the top of the plate thereon engages the bottommost plate in the stack. Further upward movement of the platform 36 results in a tilting of the assemblies of cylinders 32, slides 30 and jaws 26 about a pivot point shown at 40. Tilting movement of the jaw assemblies results in a further air signal from a valve indicated at 42 which actuates the cylinders 32 to withdraw the jaws from the stack and permits a plate from the platform 36 to occupy the position formerly occupied by the lowest plate on the stack. At this point, a further valve 44 is operated by the member 46 to return the jaw and slide assemblies to the plate supporting position shown in FIG. 1 and the platform 36 is lowered to the position also shown in FIG. 1. This cycle is repeated on a periodic basis and results in the periodic addition of a single plate to the bottom of the stack.

In order to remove a plate from the top of the stack, an air operated arrangement is also employed. As shown most clearly in FIGS. 1 and 2, the plate removal apparatus includes a rotatable indexable arrangement of Bernoulli nozzles, the structure and operation of which is more fully disclosed in my co-pending application Ser. No. 547,604, filed Feb. 6, 1975. Each of the nozzles 50 is fed with air under pressure from a common manifold 52 and the air exiting from the nozzles travels along the undersurface thereof so as to support a plate in non-contacting but closely spaced relation. By lowering a nozzle vertically aligned with the stack of ware in the oven, to the position shown in FIG. 1, and then elevating the nozzle, the uppermost plate in the stack is removed and suspended by the nozzle. The nozzle supporting assembly is then indexed around until a plate overlies the take-off conveyor 24 at which time the nozzle is depressed as indicated in the right hand portion of FIG. 1 so that the flow of air from the manifold 52 is cut off due to the inlet ports being positioned outside of the manifold. This releases the ware onto the takeoff conveyor.

Referring now to FIG. 3 of the attached drawing, there is shown a slight modification of the machine of FIGS. 1 and 2 to permit the handling of ware having a different shape precluding engagement by jaw members such as those shown at 26 in FIG. 1. In this embodiment, a dummy ware member 60 is interposed between each ware member to be glazed before positioning in the glazing oven. A stack of the dummy ware members is arranged to one side of the oven as indicated at 62. The stack is surrounded by a shield 64 which terminates above a plate 66 a distance slightly greater than the thickness of one of the members 60. A reciprocating slide 68 operating in timed relation to the cylinder 34 positions a dummy member 60 on the platform 36 immediately beneath a ware member which has been loaded onto a support 70 having an opening 72 therein to permit the cylinder 38 to elevate the dummy member 60 through the opening, into contact with the undersurface of the ware and then upwardly into engagement with the lowermost dummy ware member on the stack. The operation of the two embodiments is the same and the only differences are in the shape of the jaw members 26a which are specifically designed to engage the grooves in the dummy ware members 60. In addition, the nozzle structure for removing ware from the top of the stack is effective to remove first a plate and then a dummy ware member, the dummy ware member being released onto the upper side of the stack 62 when the turret carrying the nozzles has been indexed to that point. The treated ware is deposited on the outgoing conveyor 24 as described with reference to FIGS. 1, 2 and 3.

Figure 5:
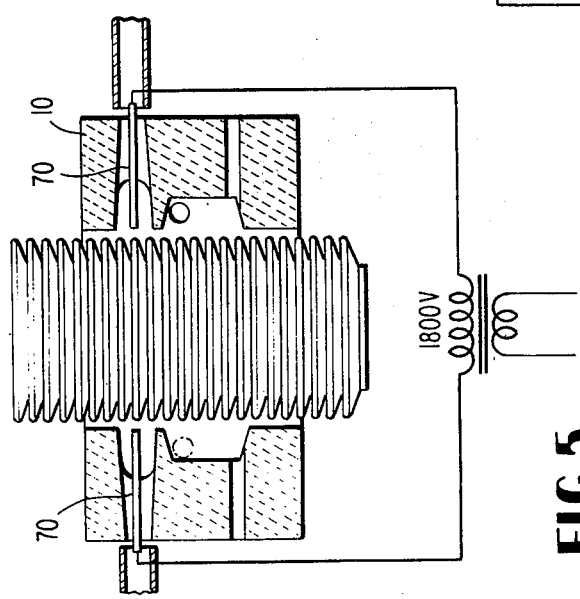
FIG. 5 is a fragmentary side elevation of a portion of a glazing oven showing the disposition of electrodes for conducting electric current to the rim of the ware to be glazed.

FIG. 5 shows how a pair of electrodes 70 may be positioned through the side walls of the oven 10 terminating in closely spaced relation to the rim of ware supported within the oven. Momentary application of a voltage of the order of 1800 volts results in the flow of electricity through the hot ionized gas particles to the rim of the ware which has already been rendered conductive by being elevated to a temperature appraoching that corresponding to a molten condition. The conduction of electric current through this portion of the ware greatly accelerates the heating process.

Figure 6:
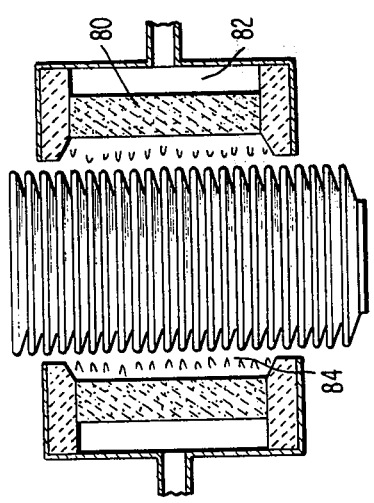
FIG. 6 is a fragmentary side elevation of an alternative glazing oven embodiment.

FIG. 6 shows another form of oven which can be used in place of the oven 10 previously described. In this form, a porous refractory material is arranged as shown at 80. Gaseous fuel at low pressure is led into the plenum chamber 82 from which chamber it diffuses through the porous refractory material and burns on the inner surface thereof as indicated at 84. The refractory material 80 becomes heated to almost incandescence with a result that the rims of the ware to be glazed are exposed to intense radiant heat from the refractory as well as to the flames.

While preferred embodiments of the invention have been herein shown and described, applicant claims the benefit of a full range of equivalents within the scope of the appended claims.

I claim:

1. Glazing apparatus for the removal of mold match marks from the rim of press molded glass ware comprising:
   an elongated housing of refractory material having aligned openings at the top and bottom to allow a stack of ware to be advanced upwardly therethrough and of sufficient length to accomodate a plurality of ware arranged in a stack for treatment therein;
   means positioned below and spaced from said housing for supporting a stack of ware to be treated so that a part of said stack is within said housing;
   means for adding ware one at a time to the lower end of said stack and for elevating said stack by a corresponding amount;
   means for removing ware one at a time from the upper end of said stack in timed relation to said means for adding; and
   means for subjecting the rims of said ware within said housing to products of combustion and to radiant heat from said refractory material.

2. Glazing apparatus as defined by claim 1 in which said refractory material is porous and surrounded by a plenum chanber;
   means for supplying gaseous fuel to said plenum chamber to be burned at the inner surface of said refractory.

3. Glazing apparatus as defined by claim 1 including:
   means defining a first plurality of passageways extending through the upper side walls of said housing in angularly disposed relationship with respect to each other and to a common horizontal plane for the admission of hot combustion products to the interior of said housing in a downwardly directed circular swirling pattern;
   means defining a second plurality of passageways through the lower portion of said housing to vent the inputs from said first plurality to the atmosphere; and
   means for injecting burning gases into each of said first plurality of said passageways.

4. Glazing apparatus as defined by claim 1 in which said means for removing ware one at a time from the upper end of said stack comprises a series of Bernoulli nozzle members rotatably indexable about a common axis for supporting said ware in non-contacting relation following removal from said stack, said nozzle members having an undersurface conforming substantially to the upper surface of the ware being handled.

5. Glazing apparatus for the removal of mold match marks from the rim of press molded glass ware comprising:
   an elongated housing of refractory material having aligned openings at opposite ends to allow a stack of ware to be advanced upwardly therethrough and of sufficient length to accommodate a plurality of stacked ware for treatment therein;
   means defining a first plurality of passageways extending through the upper side walls of said housing in angularly disposed relationship with respect to each other and to a common horizontal plane for the admission of hot combustion products to the interior of said housing in a downwardly directed circular swirling pattern;
   means defining a second plurality of passageways through the lower portion of said housing to vent the inputs from said first plurality to the atmosphere;

means positioned below and spaced from said housing for supporting a stack of ware to be treated so that a part of said stack is within said housing;

means for adding ware one at a time to the lower end of said stack and for elevating said stack by a corresponding amount;

means for removing ware one at a time from the upper end of said stack in timed relation to said means for adding; and means for injecting burning gases into each of said first plurality of passageways.

6. Glazing apparatus as defined by claim 5 including means for passing an electric current through the outer rim portion of each ware during the time it is positioned near the uppermost and therefore the hottest portion of said housing.

7. Glazing apparatus as defined by claim 5 in which said means include a pair of electrodes, one positioned within oppositely disposed ones of said first plurality of said passageways respectfully, to transfer current through the hot combustion gases to the ware.

8. Glazing apparatus for the removal of mold match marks from the rim of press molded glassware comprising:

an elongated housing of refractory material having aligned openings at the top and bottom to allow a stack of ware to be advanced upwardly therethrough and of sufficient length to accomodate a plurality of ware arranged in a stack with a dummy ware member positioned between each adjacent ware member for treatment therein;

means positioned below and spaced from said housing for supporting by engagement with the lowermost dummy ware member a stack of ware to be treated so that a part of said stack including a plurality of ware members is within said housing;

means for adding ware and dummy ware members one of each at a time to the lower end of said stack and for elevating said stack by a corresponding amount;

means for removing ware and dummy ware members successively one at a time from the upper end of said stack in timed relation to said means for adding;

means for subjecting the rims of said ware within said housing to products of combustion and to radiant heat from said refractory material;

means for recycling the dummy ware members to the bottom of the stack; and means for moving the glazed ware members removed from the upper portion of the stack to a point spaced horizontally from said housing.

9. Glazing apparatus as defined by claim 8 in which said means for removing said ware and dummy ware one at a time from the upper portion of said stack comprises a series of Bernoulli nozzle members rotatably indexable about a common axis for supporting said ware and dummy ware members in closely spaced but non-contacting relation with respect to said nozzles following removal from the stack, successive nozzle members having under surfaces conforming respectively to the upper surfaces of said ware and dummy ware members, respectively.

* * * * *